United States Patent [19]

Wollrab et al.

[11] 4,197,400

[45] Apr. 8, 1980

[54] PROCESS FOR REMOVING MONOMER RESIDUES FROM ACRYLONITRILE POLYMERS

[75] Inventors: Friedrich Wollrab; Philippe Duterme, both of Brussels, Belgium

[73] Assignee: Solvay & Cie, Brussels, Belgium

[21] Appl. No.: 629,540

[22] Filed: Nov. 6, 1975

[30] Foreign Application Priority Data

Nov. 25, 1974 [FR] France .............................. 74 38780

[51] Int. Cl.$^2$ .......................... C08F 6/00; C08F 6/16; C08F 6/24
[52] U.S. Cl. .......................... 528/500; 260/29.6 AN; 260/29.6 PT; 526/328; 526/342; 528/483
[58] Field of Search ....................... 528/483, 500, 503

[56] References Cited

U.S. PATENT DOCUMENTS

| 2,982,760 | 5/1961 | Maragliano et al. | 260/85.5 |
| 3,325,457 | 6/1967 | Finestone et al. | 260/80.5 |
| 3,454,542 | 7/1969 | Cheape et al. | 260/85.5 |
| 3,491,071 | 1/1970 | Lanzo | 260/80.78 |
| 3,553,248 | 7/1971 | Wakita et al. | 260/465.9 |
| 3,663,631 | 5/1972 | Takeya et al. | 260/654 S |
| 3,663,632 | 5/1972 | Takeya et al. | 260/654 S |

Primary Examiner—Stanford M. Levin
Attorney, Agent, or Firm—Spencer & Kaye

[57] ABSTRACT

In order to remove monomer residues from an acrylonitrile polymer which has been produced in the form of particles, for the purpose of reducing the residual monomer content to virtually negligible values, the particles are subjected to a removal process which includes raising the temperature of the particles to a value between the glass transition temperature and the melting point of the polymer.

11 Claims, No Drawings

PROCESS FOR REMOVING MONOMER RESIDUES FROM ACRYLONITRILE POLYMERS

BACKGROUND OF THE INVENTION

The present invention relates to an improved process for the complete removal of monomer residues present in acrylonitrile polymers manufactured according to processes wherein the polymers are obtained in the form of particles.

It is well known to polymerize and copolymerize acrylonitrile with the aid of a source of free radicals, the process being carried out in an aqueous medium. The polymer is insoluble in the reaction medium. As a rule, the polymerization is stopped well before the degree of conversion of the monomers reaches 100%. Accordingly, the polymer is obtained in the form of particles dispersed in an aqueous medium which still contains substantial amounts of acrylonitrile and, where relevant, comonomers, which have not reacted.

U.S. Pat. No. 3,553,248, issued to Wakita et al on Jan. 5, 1971 and assigned to Asahi Kasei Kogyo Kabushiki Kaisha, and U.S. Pat. Nos. 3,663,631 and 3,663,632, both issued to Takeya et al on May 16, 1972 and assigned to American Cyanamid Company, particularly disclose recovering the unreacted acrylonitrile by subjecting the material issuing from the reactor to a pressure reduction in a chamber kept at an absolute pressure of the order of 50 mm to 150 mm of mercury. The recovery of the acrylonitrile can be improved by entraining it by means of air or steam in the pressure release chamber. In all cases, the temperature during this operation is kept below 75° C. in order to prevent the polymer from assuming an undesirable coloration; in general, the pressure reduction is carried out at a temperature of between 35° C. and 60° C.

From the point of view of the recovery of the unreacted acrylonitrile, this process is entirely satisfactory, more than 99% of the unreacted acrylonitrile in certain cases being recovered. This does not alter the fact that it leaves unsolved an extremely grave problem. In effect, the polymer which is obtained finally by separating the particles from the aqueous medium treated in accordance with this process still contains substantial quantities of residual monomer. The presence of this residual monomer prevents the use of the acrylonitrile polymers in numerous applications for which the polymers are entirely suitable by virtue of their intrinsic properties. Such is the case for applications where the polymer is melted so as to be molded, because the residual monomer vaporizes and pollutes the atmosphere of the shop floors. Such is also the case in the foodstuff packaging field because residual monomer is to be found in the packaging materials and presents the hazard of migrating into the packaged products and rendering them unsuitable for consumption.

SUMMARY OF THE INVENTION

It is therefore an object of the present invention to provide a process which makes it possible to lower the residual monomer content of acrylonitrile polymers to virtually negligible levels.

This and other objects of the present invention are achieved, in a process for the removal of monomer residues contained in acrylonitrile polymers obtained in the form of particles, by raising the temperature of the polymer particles to a temperature value between the glass transition temperature and the melting point of the polymer.

The term "acrylonitrile polymers" is intended to denote all the polymers containing at least 50 mol %, and preferably at least 70 mol %, of monomer units derived from acrylonitrile. The acrylonitrile polymers to which the process of the invention is applicable thus comprise both the homopolymers of acrylonitrile and its copolymers containing monomer units derived from one or more comonomers. These copolymers can be statistical copolymers, block copolymers or copolymers grafted onto any trunk.

It is particularly advantageous to apply the process of the invention to the copolymers containing from 70 mol % to 95 mol % of monomer units derived from acrylonitrile, and preferably containing from 80% to 90%, which are used for the manufacture of foodstuff packagings. In general, these copolymers are either copolymers of the statistical type or copolymers grafted onto an elastomeric trunk which frequently also contains monomer units derived from acrylonitrile. In this latter case, the monomer units present in the trunk are not taken into account in determining the molar percentage of monomer units derived from acrylonitrile unless the trunk itself contains at least 50 mol % of monomer units derived from acrylonitrile. These copolymers are noteworthy for their transparency and their gas impermeability.

A large number of comonomers can be used, by themselves or as mixtures, for the manufacture of acrylonitrile copolymers. The following may be mentioned by way of examples:

Styrene derivatives such as styrene, alpha-methylstyrene and alpha-chlorostyrene; acrylic acid and its derivatives, such as methacrylic acid; acrylic esters; acrylamide and its derivatives, such as N-methyl-acrylamide; unsaturated ketones such as methyl vinyl ketone; vinyl derivatives such as vinyl chloride and vinyl acetate; olefines such as isobutene; vinylidene derivatives such as vinylidene chloride and vinylidene fluoride; unsaturated carboxylic acids such as maleic acid; and diolefines such as butadiene and isoprene.

For the manufacture of acrylonitrile copolymers for use with foodstuffs, styrene derivatives and optionally substituted acrylic esters are generally used. The best results are obtained with styrene and unsubstituted acrylic esters derived from alcohols containing from 1 to 4 carbon atoms in their molecule. In the case of graft copolymers, the best results are obtained if the trunk is an elastomeric copolymer of butadiene and of styrene, of acrylonitrile or of an acrylic ester derived from an alcohol containing from 1 to 4 carbon atoms in its molecule. By way of example of these generally used comonomers, there may be mentioned styrene, alphamethylstyrene, methyl acrylate, ethyl acrylate, butyl acrylate and methyl methacrylate.

The term "monomer units derived from acrylonitrile" is intended to denote not only the monomer units derived from unsubstituted acrylonitrile but also the monomer units derived from the substitution products of acrylonitrile and in particular from methacrylonitrile. However, it is the polymers obtained from unsubstituted acrylonitrile which are by far the most widely used.

The acrylonitrile polymers to which the process of the invention is applicable can be manufactured according to any polymerization process in which the constituents of the reaction mixture and the working conditions are such that the resulting polymer precipitates and gives rise to particles. In particular, it is possible to use gas phase polymerization, bulk polymerization, suspension polymerization, emulsion polymerization and solution polymerization processes. It is the last three processes which are most frequently employed because, due to the use of an inert liquid, the removal of heat is easier in these cases. In almost all of the cases, the inert liquid used is water. The process of the invention is particularly suitable for application to acrylonitrile polymers manufactured in an aqueous medium in view of the fact that it does not require the prior separation of the polymer particles from the aqueous medium; the aqueous polymer dispersion issuing from the polymerization reactor can be subjected to the process of the invention without any prior treatment.

If the process of the invention is applied to aqueous dispersions, these can contain, in addition to water, acrylonitrile and, optionally, one or more comonomers, the additives usually employed in polymerizations, such as free radical initiators, e.g. inorganic and organic peroxides and azo derivatives, emulsifiers, e.g. in the case of emulsion polymerization, dispersing agents, e.g. in the case of suspension polymerization, agents which improve the solubility of acrylonitrile, e.g. in the case of solution polymerization, molecular weight regulators, e.g. mercaptans, pH regulators, and the like. Other additives can also have been added during or after the polymerization; these include polymerization stoppers, coagulants, stabilizers against polymer degradation, dyestuffs, agents which improve the processability of the polymer, agents which make the polymer more shock-resistant, fillers, anti-foaming agents, and the like.

DESCRIPTION OF THE PREFERRED EMBODIMENTS

According to the process of the invention, the acrylonitrile polymer particles are raised to a temperature between the glass transition temperature and the melting point of the polymer. To determine the glass transition temperature and the melting point, the method based on measuring the variation in the coefficient of volume expansion as a function of the temperature is used. Preferably, the process is carried out at a temperature which is between 5° C. and 50° C. above the glass transition temperature. The best results are obtained at temperatures which are between 10° C. and 30° C. above the glass transition temperature.

Applicants have observed that if the recovery of the acrylonitrile is carried out at temperatures below the glass transition temperature, it is virtually impossible, with residence times of the order of one hour, to get down to acrylonitrile contents in the polymer of less than 1,000 ppm. Contents of this order are absolutely unacceptable for a large number of applications.

If the process is carried out at the glass transition temperature or above, the efficiency of the removal of acrylonitrile improves abruptly, in a considerable ratio. In effect, for a residence time of about 15 minutes, the acrylonitrile content of the polymer is less than 20 ppm and for a residence time of about one hour this content drops to below 10 ppm.

Furthermore, it is of no value to carry out the process at temperatures much higher than the glass transition temperature because the expenditure of additional heat would be incurred pointlessly.

Obviously, the duration of treatment of the polymer according to the invention must be chosen as a function of the acrylonitrile content which can be tolerated finally in the polymer. It is also a function of the temperature chosen to carry out the treatment; the higher the temperature, the shorter the duration can be. In general, the duration of the treatment is between 1 minute and 3 hours, and most frequently between 5 and 60 minutes.

The pressure applied during the treatment is preferably chosen to have a value below the saturation pressure of acrylonitrile or of the least volatile comonomer which may be present. In this way, the acrylonitrile and the comonomer or comonomers which may be present pass into the vapor phase, which facilitates their recovery, for example by condensation. It is interesting to note that the use of a high vacuum does not significantly improve the performances of the process of the invention. Equally, if the temperature during the treatment is below the glass transition temperature, it is pointless to apply a particularly high vacuum in the hope of improving the removal of the acrylonitrile; the residual amounts are practically the same as with a less good vacuum. The most plausible explanation which applicants can provide for this phenomenon is that their process makes it possible to remove not only the acrylonitrile present in the reaction mixture or absorbed on the polymer particles but also the acrylonitrile which is trapped inside the polymer particles and is inaccessible to the processes of the prior art.

The process of the invention can be applied to the polymer particles after they have been separated from the polymerization medium, whether the latter consists principally of the liquid or gaseous monomer or of an inert liquid such as water. This separation can be effected by any known means such as decanting, filtering, or centrifuging.

If the polymer is manufactured according to a polymerization process which yields the polymer in the form of an aqueous dispersion, applicants however prefer, as has been stated above, to carry out the treatment according to the invention directly on the aqueous dispersion, if appropriate after having coagulated, concentrated and/or diluted the dispersion.

The treatment according to the invention can be carried out continuously or discontinuously. If it is carried out discontinuously, and the polymerization is also carried out discontinuously, it can be advantageous to carry out the treatment in the actual polymerization reactor. If it is carried out continuously, it is possible to use, for example, vessels arranged in series.

The removal of the acrylonitrile and of the comonomer or comonomers which may be present, already facilitated by the fact that the process is carried out at a pressure below their saturation pressure, can be further improved by means of an entrainment by a gas, preferably a hot gas, such as air, nitrogen and carbon dioxide, or a vapor such as steam.

The polymer can be heated to the desired temperature by any known means, such as by mixing with a hot fluid, by passing through a heat exchanger, by means of a double jacket for the treatment vessel, by condensation of a vapor, and the like.

If the treatment according to the invention is carried out on an aqueous polymer dispersion it is particularly advantageous to use entrainment by steam, i.e. steam stripping. Not only are benefits provided by the entrainment effect, but this technique also provides a means of heating which permits particularly easy temperature regulation; it suffices to regulate the pressure, for example by means of an ejector, if the process is carried out at a pressure below atmospheric pressure. The gas issuing from the chamber in which the process is carried out can be condensed and distilled to recover the monomers. If the process is carried out continuously, the treatment can advantageously be carried out in a tray column or a pack column, fed at the top with the aqueous polymer dispersion to be treated and at the bottom with steam, the gas which issues being withdrawn at the top and the mean residence time of the suspension in the column being chosen to be equal to the desired duration of the treatment.

If the treatment of the invention is applied to the polymer when it is in the form of an aqueous dispersion, an aqueous dispersion of the polymer is usually also recovered at the end of the treatment. The polymer is separated from the aqueous phase by any known means, for example by filtering or centrifuging. It is then dried, again by a known technique, for example in a fluidized bed. If the preferred embodiments of the invention have been employed, the aqueous phase which is recovered finally is completely free from acrylonitrile; it can thus be used, without hazard, for any purpose whatsoever.

As has been stated above, the process of the invention makes it possible to obtain acrylonitrile polymers and copolymers wherein the content of acrylonitrile and, if relevant, of comonomers is extremely low, namely a few ppm. These polymers can be employed in conventional machines such as screw extruders without there being the slightest hazard to the health of the individuals who are running these machines.

The process of the invention is particularly valuable for the treatment of copolymers for use with foodstuffs, such as acrylonitrile-styrene copolymers, acrylonitrile-methyl acrylate copolymers, and acrylonitrile-methyl acrylate copolymers grafted onto a butadiene-acrylonitrile or butadiene-methyl acrylate elastomer. These copolymers are currently the subject of extensive development in the field of manufacture of bioriented bottles by injection-blowing or extrusion-blowing, the bottles being intended to contain beer and other gaseous beverages. By virtue of their intrinsic properties, e.g. transparency, pressure resistance, orientability, and impermeability to oxygen and to carbon dioxide, these copolymers are practically the only plastics which can currently be used for this application. Now, it is absolutely essential for this use that any hazard of contamination of the packaged drinks by the residual monomers be eliminated with certainty. The contamination tolerance threshold for beverages is in effect of the order of one ppb. The only way of being completely assured of satisfying this requirement consists of using, for this application, only copolymers which contain no more than a few ppm of residual monomers. Only the process of the invention makes it possible to achieve this.

The invention is further explained by the examples which follow and which are given purely by way of illustration.

EXAMPLES $R_1$ to $R_3$ and 4 to 7

The examples are carried out with a statistical copolymer of acrylonitrile and methyl acrylate containing about 83 mol % of acrylonitrile, and prepared in the following manner.

A stainless steel autoclave of 5 liters capacity is used. This autoclave is equipped with a stirrer with two blades. The autoclave is deoxygenated by being placed under vacuum three times in succession, interspaced with two sweeps with nitrogen. 750 g of acrylonitrile, 250 g of methyl acrylate, 10 g of n-dodecyl-mercaptan and 1 g of azo-bis-isobutyronitrile are introduced successively. The stirrer is started and after three minutes 2 liters of deionized water containing 2 g of dissolved polyvinyl alcohol are introduced. Thereafter, a vacuum equal to an absolute pressure of 150 mm of mercury is established. The autoclave is heated to 70° C. and is kept at this temperature for 6 hours. At the end of this period, the degree of conversion of the monomers reaches about 90%. Finally, the aqueous suspension is transferred into a flask for the treatment in which the residual monomers are removed.

A 10 liter flask equipped with five orifices is used for this removal. Through these orifices pass the stirrer shaft, a steam dip tube inlet, an outlet tube connected to a condenser, a tube on which is fitted a safety valve, and a tube which serves to measure the temperature. As soon as the aqueous polymer suspension has been transferred into the flask, the stirrer is started, the cooling water circuit of the condenser is opened and the flask is closed. Steam under an absolute pressure of 1.5 kg/cm² is then introduced. The system is kept under a set pressure manually. This pressure is chosen in accordance with the temperature at which it is desired to carry out the treatment. As soon as this temperature is reached, the time is noted; this represents the initial time to be considered in determining the duration of the treatment.

When the desired duration of the treatment has expired, the introduction of steam is stopped and the aqueous suspension is allowed to cool. Thereafter, the polymer is separated off by filtration and is dried in a vacuum oven, kept at 60° C. for 6 hours. Thereafter, the final monomer contents of the polymer, as well as its glass transition temperature which is 79° C., are determined.

Table I indicates the working conditions relating to each experiment, as well as the results. Experiments $R_1$ to $R_3$ are given by way of comparison and relate to treatments performed below the glass transition temperature.

TABLE I

| Experiment number | $R_1$ | $R_2$ | $R_3$ | 4 | 5 | 6 | 7 |
|---|---|---|---|---|---|---|---|
| Treatment temperature, °C. | 60 | 70 | 75 | 80 | 85 | 100 | 100 |
| Duration of treatment, minutes | 15 | 15 | 15 | 15 | 15 | 15 | 60 |
| Pressure, mm of mercury | 160 | 230 | 290 | 350 | 430 | 760 | 760 |
| Final content in the polymer: acrylonitrile, ppm | 8,100 | 1,600 | 1,500 | 47 | 39 | 12 | 6 |
| methyl acrylate, ppm | 4,800 | 2,000 | 1,900 | 290 | 180 | 15 | 8 |

These experiments show that the fact that the process is carried out at a temperature equal to or greater than 80° C. suddenly and to a very great extent increases the efficiency of the treatment.

EXAMPLES 8 to 11

Examples 8 to 11 are carried out with a statistical copolymer of acrylonitrile and styrene containing about 74 mol % of acrylonitrile, obtained by copolymerization of acrylonitrile and styrene in aqueous suspension under the usual polymerization conditions, i.e. using polyvinyl alcohol as the dispersing agent, azo-bis-isobutyronitrile as the initiator and laurylmercaptan as the chain transfer agent. Its glass transition temperature is about 100° C.

The treatment for removing the residual monomers contained in the copolymer present in the aqueous suspension is carried out in accordance with the working method used in Examples $R_1$ to 7.

Table II indicates the working conditions relating to each experiment, as well as the results.

TABLE II

| Experiment number | 8 | 9 | 10 | 11 |
|---|---|---|---|---|
| Treatment temperature, ° C. | 100 | 110 | 120 | 120 |
| Duration of treatment, minutes | 30 | 30 | 15 | 30 |
| Pressure, mm of mercury | 760 | 1,075 | 1,489 | 1,489 |
| Final acrylonitrile content of the polymer, ppm | 710 | 34 | 62 | 6 |

It will be understood that the above description of the present invention is susceptible to various modifications, changes and adaptations, and the same are intended to be comprehended within the meaning and range of equivalents of the appended claims.

What is claimed is:

1. In a process for removing monomer residues contained in an acrylonitrile polymer obtained in the form of particles and containing at least 50 mol % of monomer units of acrylonitrile, wherein the particles of polymer are raised in temperature, the improvement consisting of raising the particles to a temperature between their glass transition temperature and their melting point while keeping them at a pressure below the saturation pressure of acrylonitrile or of the least volatile monomer which may be present, maintaining the polymer particles at the temperature to which they are raised for a period of between 1 minute and 3 hours, and subjecting the polymer particles to gas or vapor stripping after said step of raising and while they are maintained at the temperature to which they have been raised, in order to obtain a polymer in which the acrylonitrile content is less than 20 ppm.

2. Process according to claim 1 wherein said step of raising is carried out to raise the polymer particles to a temperature between 5° C. and 50° C. above the glass transition temperature.

3. Process according to claim 2 wherein said step of raising is carried out to raise the polymer particles to a temperature between 10° C. and 30° C. above the glass transition temperature.

4. Process according to claim 2 further comprising maintaining the polymer particles at the temperature to which they are raised for a period of between 5 and 60 minutes.

5. Process according to claim 1 wherein the polymer particles are in the form of an aqueous dispersion when they are at the temperature to which they have been raised.

6. Process according to claim 5 wherein the aqueous dispersion is obtained directly from the polymerization reaction by which the polymer is produced.

7. Process according to claim 1 wherein the stripping is steam stripping.

8. Process according to claim 1 wherein the polymer contains at least 70 mol % of acrylonitrile monomer units.

9. Process according to claim 1 wherein the polymer containing at least 50 mol % of acrylonitrile monomer units is a copolymer containing 70 mol % to 95 mol % of acrylonitrile monomer units as well as acrylic ester monomer units formed from alcohols containing 1 to 4 carbon atoms in their molecule.

10. Process according to claim 1 wherein the polymer containing at least 50 mol % of acrylonitrile monomer units is a copolymer containing from 70 mol % to 95 mol % of acrylonitrile monomer units as well as styrene monomer units.

11. Process according to claim 1 wherein the acrylonitrile content of the obtained polymer is less than 10 ppm.

* * * * *